(12) United States Patent
Holms et al.

(10) Patent No.: US 7,243,613 B2
(45) Date of Patent: Jul. 17, 2007

(54) MULTI-CHAMBER SELECTIVE-EXPOSURE AQUARIUM

(76) Inventors: Debra A. Holms, W159 N9833 Butternut Rd., Germantown, WI (US) 53022; Rory J. Holms, W159 N9833 Butternut Rd., Germantown, WI (US) 53022

( * ) Notice: Subject to any disclaimer, the term of this patent is extended or adjusted under 35 U.S.C. 154(b) by 0 days.

(21) Appl. No.: 11/071,826

(22) Filed: Mar. 3, 2005

(65) Prior Publication Data
US 2006/0196441 A1 Sep. 7, 2006

(51) Int. Cl.
*A01K 63/00* (2006.01)

(52) U.S. Cl. ........................ 119/248; 119/251

(58) Field of Classification Search ........ 119/245–269; D30/101–107
See application file for complete search history.

(56) References Cited

U.S. PATENT DOCUMENTS

| | | | |
|---|---|---|---|
| 1,333,454 A | | 3/1920 | Sato |
| D78,013 S | * | 3/1929 | Downie ............... D30/104 |
| 1,838,215 A | | 12/1931 | Clairmont |
| D134,689 S | * | 12/1942 | Waltman ............. D30/104 |
| D134,953 S | | 2/1943 | Greenberg |
| D134,954 S | | 2/1943 | Greenberg |
| D134,955 S | | 2/1943 | Greenberg |
| 3,018,758 A | | 1/1962 | Arnould |
| 3,255,731 A | * | 6/1966 | Girard ................ 119/224 |
| 3,288,110 A | | 11/1966 | Goldman et al. |
| 3,291,098 A | * | 12/1966 | Halpert ............... 119/252 |
| 3,304,912 A | | 2/1967 | Hackman et al. |
| 3,326,185 A | | 6/1967 | Perez |
| D211,953 S | | 8/1968 | Whittaker |
| 3,512,503 A | | 5/1970 | Willinger |
| 3,664,301 A | | 5/1972 | Morrill |
| 3,706,299 A | | 12/1972 | Hendges |
| D238,884 S | | 2/1976 | Robert |
| D239,180 S | | 3/1976 | Robert |
| 3,951,293 A | | 4/1976 | Schulz |
| 4,044,721 A | | 8/1977 | Foley et al. |
| 4,120,265 A | | 10/1978 | Davis |

(Continued)

FOREIGN PATENT DOCUMENTS

| | | | |
|---|---|---|---|
| GB | 2268683 A | * | 1/1994 |
| JP | 08-238037 | * | 9/1996 |

OTHER PUBLICATIONS www.petco.com Fish Shop, Lee's Dual Betta Hex (http://www.petco.com/product_info.asp?familyid=9435&sku=1038... [retrieved from internet Sep. 27, 2004])2 pages.*

(Continued)

*Primary Examiner*—Andrea Valenti
(74) *Attorney, Agent, or Firm*—Jansson Shupe & Munger Ltd.

(57) ABSTRACT

A multi-chamber selective-exposure aquarium apparatus including: a first portion forming a first aquarium chamber having a first transparent primary wall; a second portion forming a second aquarium chamber having a second transparent primary wall; and a visual barrier device for selective exposure/non-exposure of the first and second transparent primary walls, whereby fish in each of the first and second aquarium chambers are selectively visually exposed/non-exposed to each other's presence. Fish in separate aquarium chambers are preferably male betta fish.

4 Claims, 7 Drawing Sheets

U.S. PATENT DOCUMENTS

| | | |
|---|---|---|
| 4,236,488 A | 12/1980 | Olds et al. |
| 4,318,945 A | 3/1982 | Goldman et al. |
| 4,323,032 A * | 4/1982 | Halfon ................. 119/248 |
| D279,317 S | 6/1985 | Goldman et al. |
| 4,639,101 A | 1/1987 | Stefancin, Jr. |
| D294,129 S | 2/1988 | Grun |
| 4,863,051 A | 9/1989 | Eibner et al. |
| 4,920,922 A | 5/1990 | Tominaga |
| 4,974,545 A | 12/1990 | Jones |
| 5,000,118 A | 3/1991 | Merritt et al. |
| 5,090,357 A | 2/1992 | Pucci |
| D327,142 S | 6/1992 | Pilgrim, Jr. |
| 5,255,811 A | 10/1993 | Simon |
| 5,257,596 A | 11/1993 | Jones |
| D350,626 S | 9/1994 | Ross |
| 5,363,801 A | 11/1994 | Watters et al. |
| 5,365,884 A | 11/1994 | Jones |
| 5,451,443 A | 9/1995 | Wechsler |
| D373,693 S | 9/1996 | Elhage |
| 5,597,228 A | 1/1997 | Boyle |
| D400,312 S | 10/1998 | Wing |
| 5,957,084 A | 9/1999 | Knepp |
| 6,105,535 A | 8/2000 | Atamian et al. |
| 6,148,770 A | 11/2000 | Lin |
| D449,717 S | 10/2001 | Fang |
| D451,249 S * | 11/2001 | Fang .................... D30/101 |
| 6,327,997 B1 | 12/2001 | Terry et al. |
| 6,354,246 B1 | 3/2002 | Kamihata et al. |
| 6,443,099 B1 | 9/2002 | Boggs |
| 6,536,374 B1 * | 3/2003 | Suerth et al. ............ 119/248 |
| 6,665,964 B2 | 12/2003 | Klotz |
| D490,940 S | 6/2004 | Wang |
| 6,755,154 B1 | 6/2004 | Goldman et al. |
| 2004/0045511 A1 * | 3/2004 | Migita .................... 119/472 |

OTHER PUBLICATIONS

Chimpfeet gifts for pets, Fish Bowl Book Ends, http://www.chimpfeet.com/details.htm?id=2379 [retrieved from internet Aug. 17, 2006] 1 page.*

Excerpt from auctionworks.com website (5 pages). Dated: Oct. 5, 2004, Sponge Bob Squarepants Betta Tank.

Excerpt from Petco website (2 pages). Dated: Sep. 27,2004, Sponge Bob Squarepants Bikini Bottom Aquarium Aqua Kit.

Excerpt from Petco website (3 pages). Dated: Sep. 27, 2994, Fish Shop Lee's Dual Betta Hex, Lee's Small round Kritter Keeper.

Excerpt from Taylor Gifts website (4 pages). Dated: Oct. 13, 2004, Office Fish Tank.

Excerpt from Velvet Giraffe website (1 page). Dated: Oct. 5, 2004, Deco Art Betta Fish Tanks.

Excerpt from Petco website (2 pages). Dated: Sep. 27, 2004.

Excerpt from Petco website (1 page). Dated: Sep. 27, 2004.

* cited by examiner

MULTI-CHAMBER SELECTIVE-EXPOSURE AQUARIUM

FIELD OF THE INVENTION

This invention relates in general to aquariums for small aquatic animals. More particularly, to aquarium devices that facilitate the concept of selective exposure/non-exposure of two tropical male fish which when see each other express their hostility by beautifully puffing their long brightly colored fins.

BACKGROUND OF THE INVENTION

Brilliant coloration, and long flowing fins make Belontiidae or Gourami fish family one of the most well known of aquarium fish. A very interesting and attractive thing for people viewing the fish is when two fish see one another and puff their fins. However, males of some species, such as betta or paradise fish, are well-known for their highly pugnacious behavior towards one another and it is understood that two such males may not be in the same tank since such puffing is an expression of an aggressiveness preceding a fight.

Variety of compartmental aquariums with transparent dividers separating several betta males in the same tank have been proposed. Such aquariums take advantage of behavioral characteristics of betta males by encouraging them to interact without harming each other. On the other hand, transparency of the dividers in such aquariums forces the fish to stay in an attacking mood at all times. This leaves out a possibility to see calm betta males and an option to stimulate their puffing at certain times.

Visual isolation of the separate aquarium chambers is also desirable for breeding of the tropical fish. Because the male collects the eggs which float to the surface after a courtship, then he spits them into the bubble nest beneath a large leaf. The female should be removed at that point because the male is aggressively guarding the eggs and may harm the female. Thus, placement of the female into a separate visually isolated chamber of the same aquarium would allow successful completion of the breeding process.

The novelty of this invention is a multiple-chamber aquarium designed to permit visual blocking and unblocking of a clear wall separating same aquarium water-chambers.

OBJECTS OF THE INVENTION

It is an object of the invention to provide an improved aquarium overcoming some of the problems and shortcomings of the prior art, including those referred to above.

Another object of the invention is to provide an improved aquarium apparatus including two distinct portions that are visually separable from each other.

Another object of the invention is to provide an improved aquarium apparatus permitting selective exposure and non-exposure of betta males to one another.

Still another object of the invention is to provide an improved aquarium apparatus having two individual containers each designed for their adjacent positioning to stimulate interaction of betta males in each container.

How these and other objects are accomplished will become apparent from the following descriptions and the drawings.

SUMMARY OF THE INVENTION

This invention, which will be described in detail below, is an improvement in compartmental aquariums to include two distinct portion, within the same aquarium, that are visually separable from each other.

The present invention provides a multi-chamber aquarium apparatus having a device for optional exposure or visual isolation of the chambers. The aquarium apparatus includes: (1) a first portion forming a first aquarium chamber having a first transparent primary wall; (2) a second portion forming a second aquarium chamber having a second transparent primary wall; and (3) a visual barrier device for selective exposure/non-exposure of the first and second transparent primary walls. Whereby fish in each of the first and second aquarium chambers can be visually isolated or exposed to each other's presence. The selective exposure/non-exposure device is a non-transparent barrier between the first and second clear primary walls. In some cases the primary walls are substantially vertical.

In a preferred embodiment, betta fish are placed into each of the first and second aquarium chambers. Both of the betta fish are preferably male.

In highly preferred embodiments the first and second portions are in fixed relative positions and a slot is formed between the first and second transparent primary walls. The non-transparent barrier is a removable screen within the slot. The term "removable," as used herein, means that the screen may be inserted into the slot for a visual intervention between chambers so that the fish cannot see each other, and, when desired, the screen can be taken out to stimulate male fish interaction for observation of their beautiful puffing. Such barrier may be made of a substantially rigid material shaped to correspond with a shape of the slot. In some instances a sheet of a flexible material may be used to make the screen configured to match dimensions of the slot.

In certain preferred embodiments of the invention, the first and second portions are separate independently movable containers shaped such that the first and second transparent primary walls are positionable immediately adjacent to one another.

In such preferred embodiments each of the independently movable containers is a readily-portable container. Preferably, there is a betta inside each container. Both betta fish are preferably male.

As noted above, "readily-portable" refers to jars and the like which may be gripped in a hand in order to pour out and replace the water; one-hand portability depends upon size and whether there is a suitable grip, such as the neck or width of the jar and/or a handle to facilitate pouring.

DETAILED DESCRIPTION OF PREFERRED EMBODIMENTS

Figure 1:
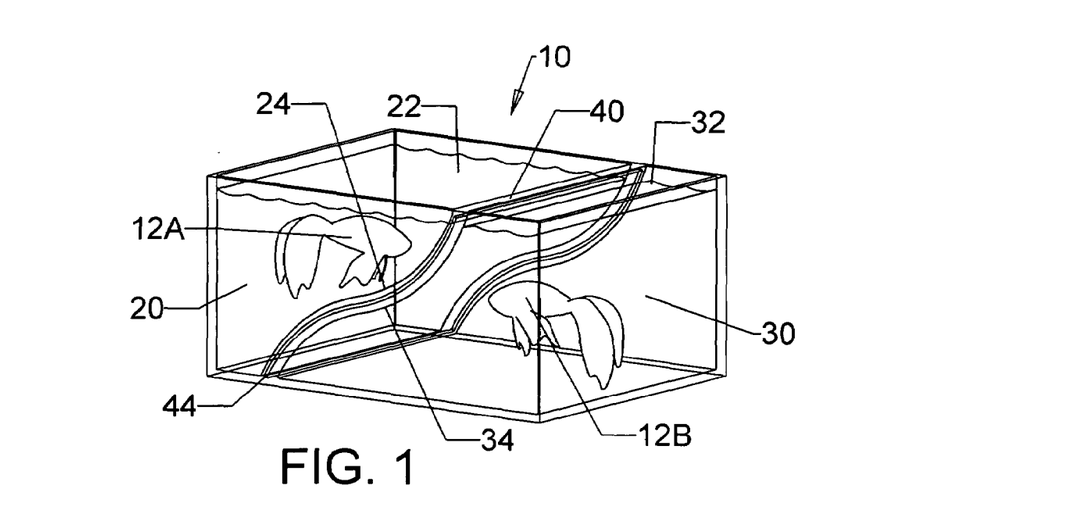
FIG. 1 is a perspective view of a preferred embodiment of the inventive multi-chamber selective-exposure aquarium.
Figure 2:
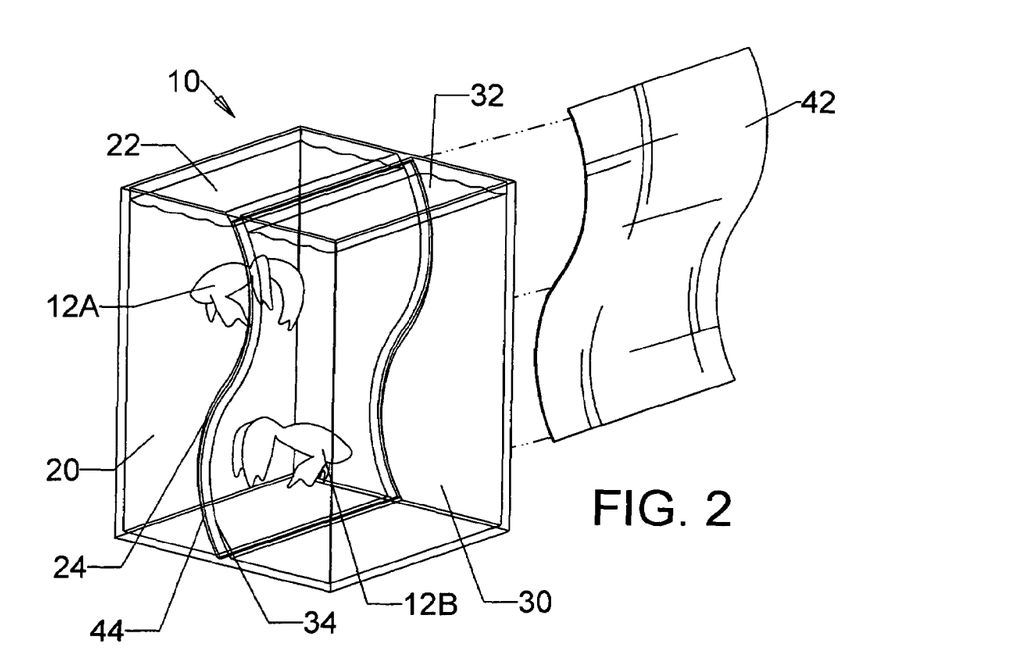
FIG. 2 is a perspective view of a highly preferred embodiment of the aquarium of FIG. 1 having the primary walls substantially vertical and showing a non-transparent screen inserted into a visual barrier device from the side.

Referring to FIG. 1, an improved multi-chamber aquarium apparatus 10 includes a first portion 20 forming a first aquarium chamber 22 having a first transparent primary wall 24, a second portion 30 forming a second aquarium chamber 32 having a second transparent primary wall 34, and a visual barrier device 40. A betta fish 12a and 12b are separately placed into respectively first 22 and second 32 aquarium chambers.

As shown in FIGS. 2, 4, 6A and 11A, the offensive interaction of fish 12a and fish 12b can be interrupted by the inserting a non-transparent screen 42 into a slot 44 formed by first and second clear primary walls 24 and 34. When desired to excite the fish for observation of their beautiful puffing, intervening between chambers can be eliminated by removing screen 42 from slot 44 and showing the fish to each other. As seen in FIGS. 1–4, the slot 44 can form many shapes.

Figures 3, 4:
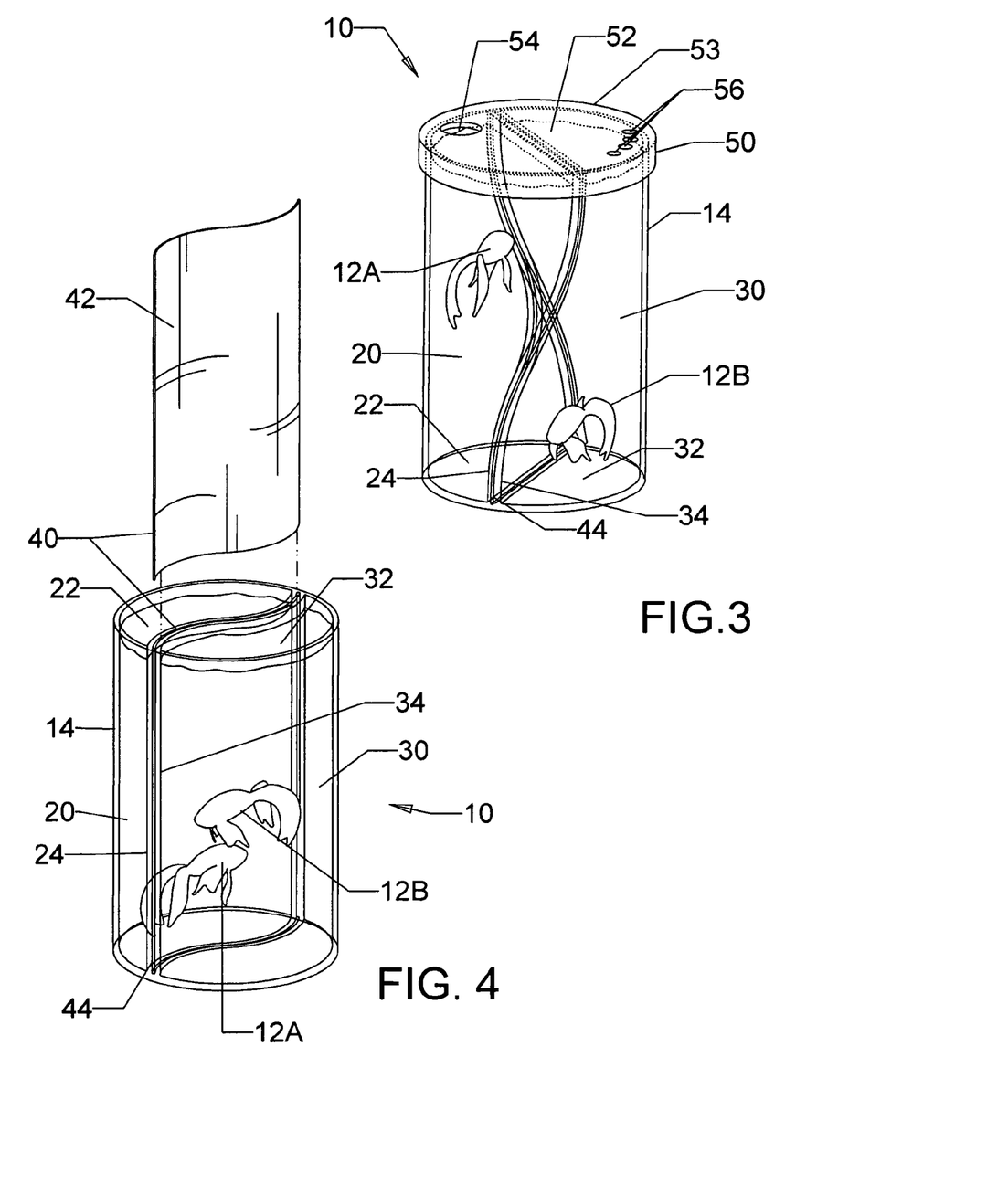
FIG. 3 is a perspective view of an alternative embodiment of the aquarium of FIG. 1 dimensioned as a readily-portable jar-aquarium.
FIG. 4 is a perspective view of another alternative embodiment of FIG. 1 dimensioned as a readily-portable jar-aquarium and showing a non-transparent screen inserted into a visual barrier device from the top.

FIGS. 3 and 4 illustrate an aquarium 10 formed by a readily portable container 14.

It is known that aquarium water is reach with nutrients provided by the breakdown of products of the fish's metabolism and bacterial breakdown of waste products which are found highly beneficial as a fertilizer for house-plants. Such nutrient-enriched water can be immediately used for watering plants without aging or special preparation.

To utilize the valuable quality of aquarium water, FIG. 3 shows an aquarium 10 that has a cap 50 removably secured to container 14 enclosing its open mouth so fish would not slip out while watering house plants directly from aquarium 10.

As seen in FIG. 3, cap 50 comprises a topwall 52 with an edge 53 and includes at least one ingress aperture 54 sized to accept free unbroken water-stream passage therethrough for cap-on filling of aquarium 10 and a series of egress apertures 56 smaller than the ingress aperture 54, spaced therefrom and grouped together along the edge to facilitate controlled cap-on out-pouring of water, whereby the water of aquarium 10 may be changed without removing cap 50. When pouring water out, egress apertures 56 manage the flow intensity and direct the out-pouring water.

The term "removably secured," as used herein, means that cap 50 is tightly fastened to the open end of aquarium 10 and is held in place when inverted withstanding a pressure of the out-pouring water, and that the cap and the container cam be separated to permit access into the aquarium interior through the open end of the container allowing engagement and disengagement of screen 42 with visual barrier device 40. Examples of such cap-container connection can be a hitch, threading, snap or frictional (cork type) engagement. FIG. 4 illustrates a further embodiment of te present invention utilizing a top-placement of screen 42 through slot 44.

Figure 5:
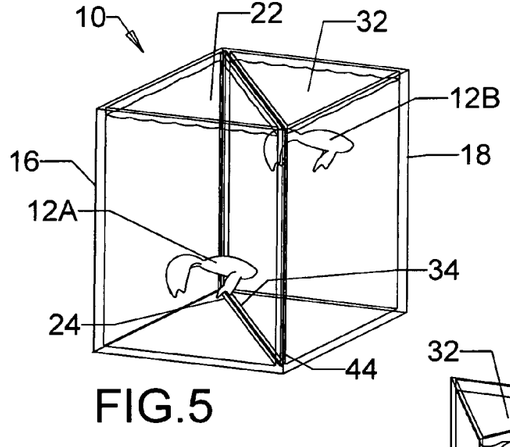
FIG. 5 is a perspective view of a certain preferred embodiment of the claimed aquarium having two independently movable containers positioned immediately adjacent to each other.

FIG. 5 illustrates aquarium 10 which is a certain preferred embodiment of the invention having two independently movable containers 16 and 18 positioned immediately adjacent to each other in a manner to form visual barrier device 40 with slot 44 between first primary wall 24 and second primary wall 34 for insertion of screen 42.

Alternative versions of the adjacent positioning of containers 16 and 18 are illustrated on FIGS. 6A–8B. On these figures container 18 is dimensioned so it can be placed on top of the water surface of container 16. First primary wall 24 is formed by a bottom wall 18a of container 18 and second primary wall 34 is formed topwall 16a of container 16.

Figure 6A:
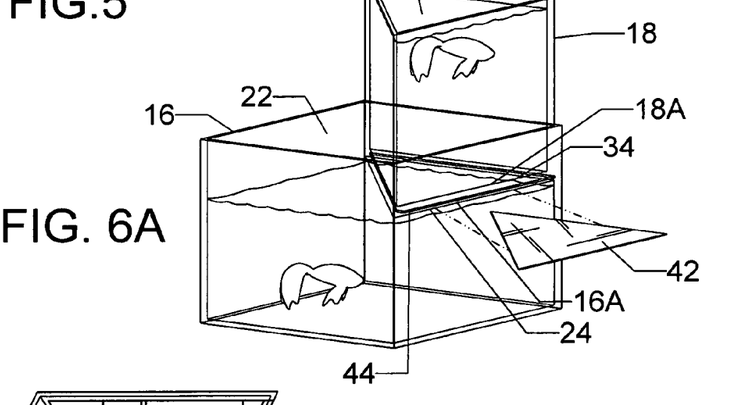
FIGS. 6A and 6B are a perspective and top views, respectively, illustrating a variant of a certain preferred embodiment of the claimed aquarium having one independently movable containers positioned immediately on top of another with the primary walls being substantially horizontal, and showing a non-transparent screen inserted into a visual barrier device.
Figure 6B:
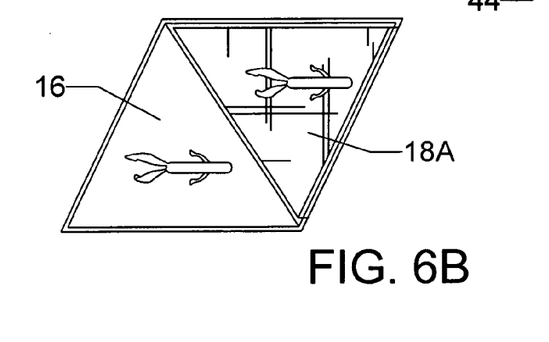
Figure 7A:
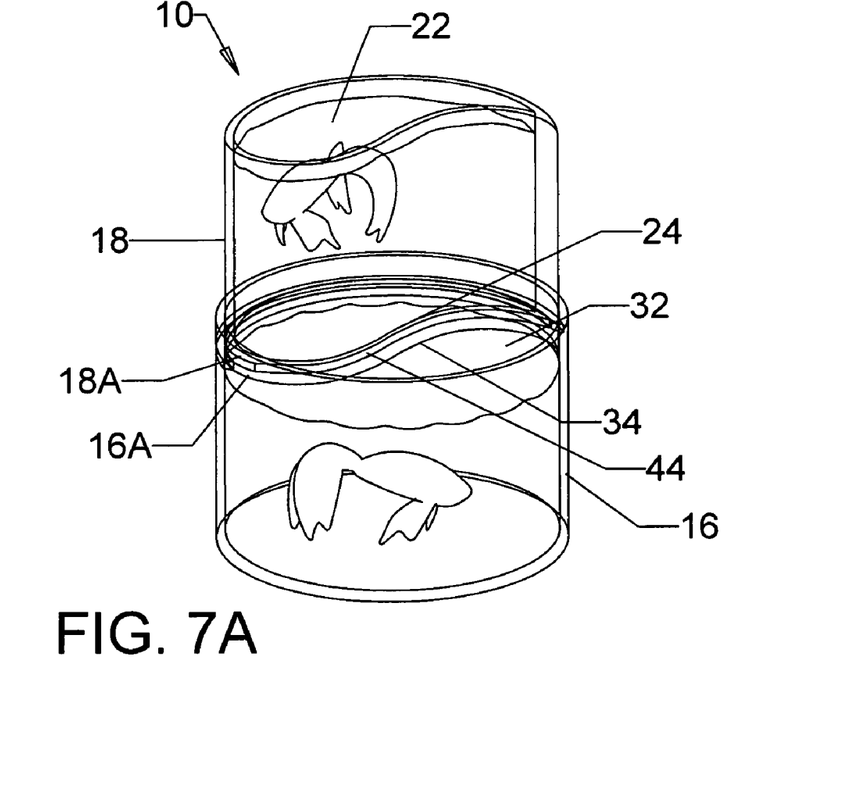
FIGS. 7A and 7B are a perspective and plan views, respectively, demonstrating another variant of a certain preferred embodiment of the claimed aquarium having one independently movable containers positioned immediately on top of the other.
Figure 7B:
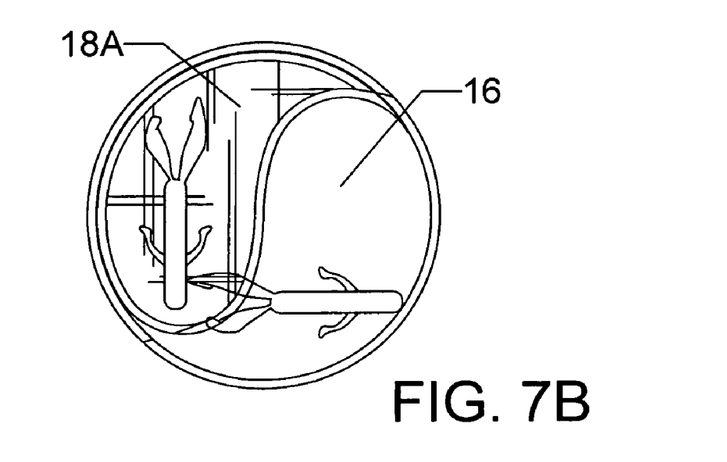
Figure 8A:
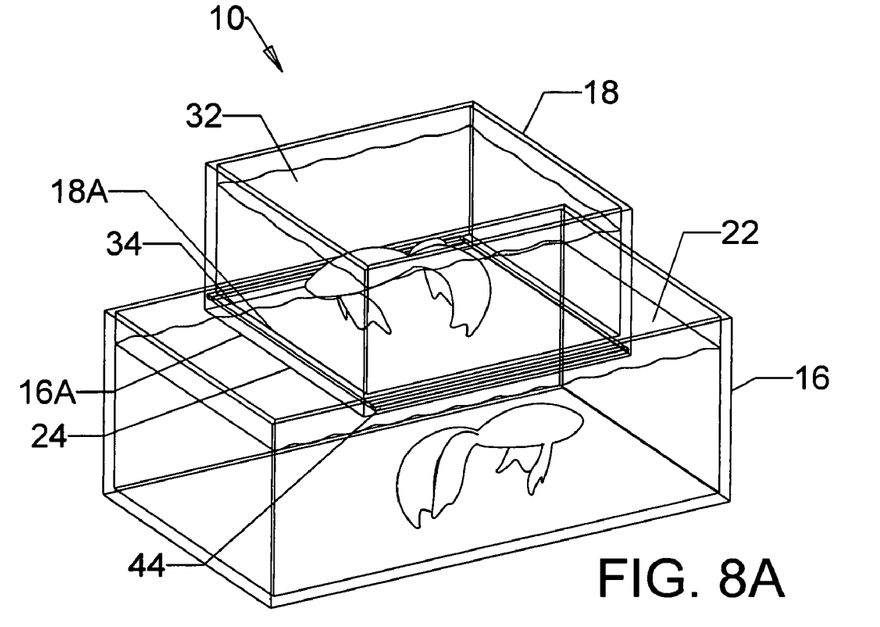
FIGS. 8A and 8B are a perspective and plan views, respectively showing yet another variant of a certain preferred embodiment of the claimed aquarium having one independently movable containers positioned immediately on top of the other.
Figure 8B:
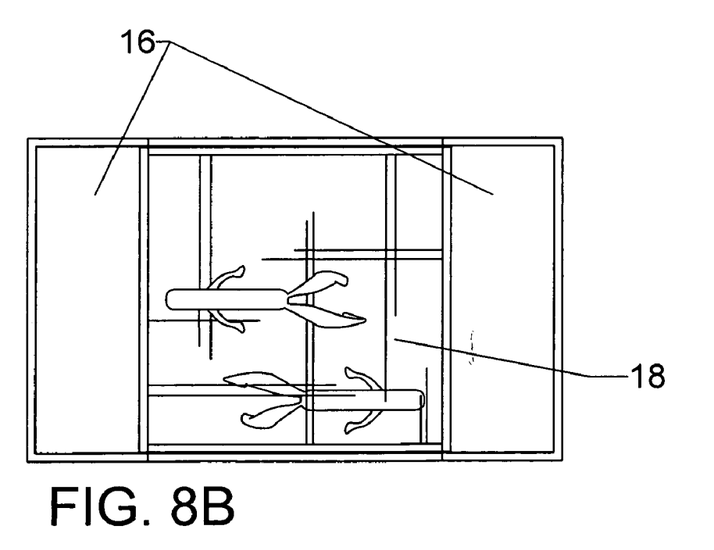
Figure 9A:
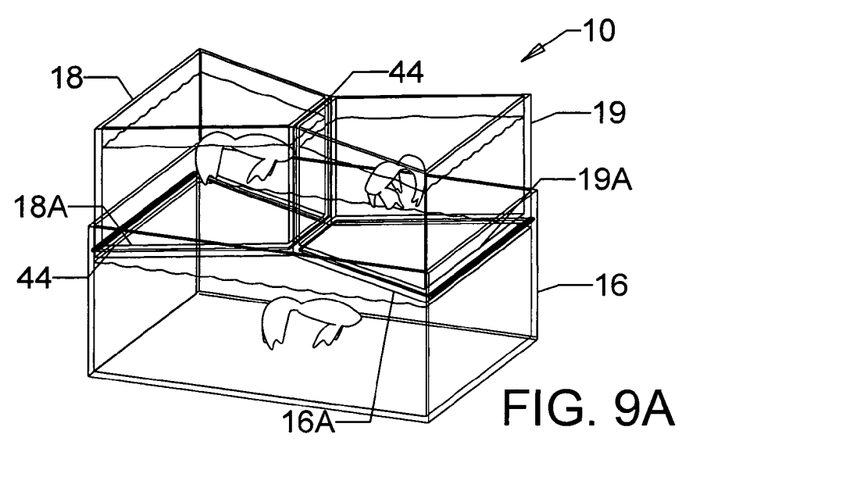
FIGS. 9A and 9B are a perspective and plan views, respectively, illustrating a variant of a certain preferred embodiment of the claimed aquarium showing an arrangement of three separate containers.
Figure 9B:
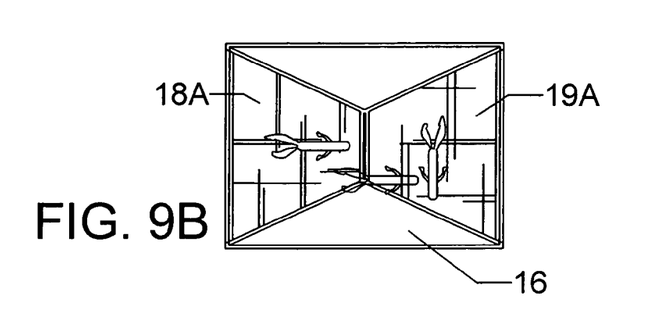
Figure 10:
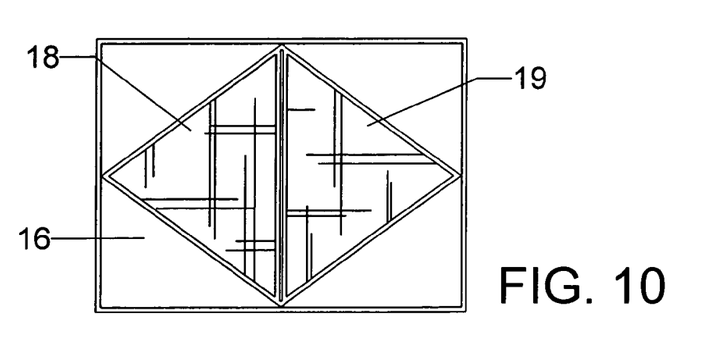
FIG. 10 is a plan view of a possible version for an alternative embodiment to the aquarium of FIGS. 9A and 9.
Figure 11A:
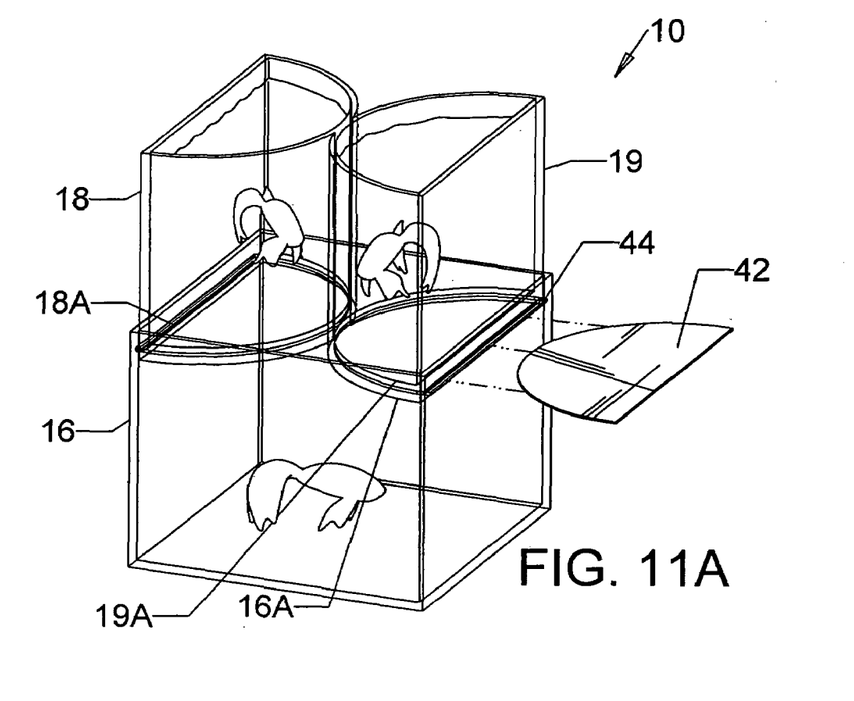
FIGS. 11A and 11B are a perspective and plan views, respectively, illustrating another possible version for an alternative embodiment of the claimed aquarium having two containers of placed immediately on top of the third larger container, and showing an insertion of the screen dimensioned to match slot formed in the smaller containers' bottom walls.
Figure 11B:
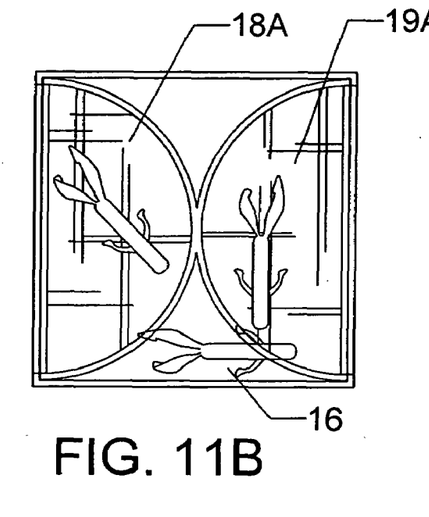
Figure 12:
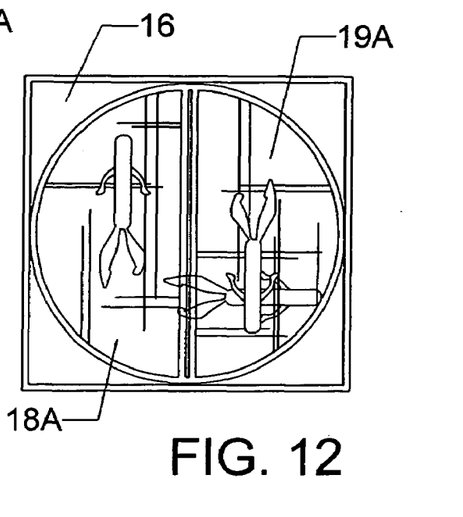
FIG. 12 is a plan view illustrating yet another possible version for an alternative embodiment of the claimed aquarium having two containers placed immediately on top of the third larger container.

Because betta fish are from a family of surface-air breathing aquatic animals, aquarium 10 must have enough open water surface allowing the fish access to the surface air for breathing. Aquarium 10 of the certain preferred embodiments shown on FIGS. 6B, 7B and 8B is designed so topwall 16a and bottom wall 18a cover only a part of container 18 water surface sufficient to stimulate interaction of fish 12a and 12b, while leaving the rest open to accommodate breathing of fish 12a.

FIG. 9A-12 illustrate different embodiments of aquarium 10 formed by an arrangement of three independent containers 16, 18 and 19. As seen on these figures, containers 18 and 19 are of substantially similar capacity and container 16 is larger than either of containers 18 or 19. Containers 18 and 19 are adjacently positioned to form slot 44 of visual blocking device 40, and are placed on container 16. Thus each container has two primary walls so fish in each of the three containers can see two other fish in two other containers. As seen on FIGS. 9B, 10, 11B and 12, such arrangement maintains open water surface in each container to accommodate surface air breathing of betta fish.

While the principles of the invention have been shown and described in connection with specific embodiments, it is to be understood that such embodiments are by way of example and are not limiting.

The invention claimed is:

1. A unitary multi-chamber selective-exposure aquarium apparatus comprising:
    a first portion forming a first aquarium chamber having an internal first transparent primary wall spanning substantially a complete width and height of the first portion;
    a second portion secured to and in fixed relative position with the first portion, the second portion forming a second aquarium chamber that is isolated from the first aquarium chamber and having an internal second transparent primary wall and having an internal second transparent primary wall spanning substantially a complete width and height of the second portion, the second transparent primary wall being positioned immediately adjacent to and substantially parallel with the first transparent primary wall, the first and second internal transparent primary walls forming a slot therebetween; and a non-transparent visual barrier device removably disposed within the slot between the first and second internal transparent primary walls for selective exposure/non-exposure of the first and second transparent primary walls which maintain the visual barrier device substantially parallel thereto, whereby fish in each of the first and second aquarium chambers are selectively visually exposed/non-exposed to each other's presence.

2. The multi-chamber selective-exposure aquarium apparatus of claim 1 wherein the primary walls are substantially vertical.

3. The multi-chamber selective-exposure aquarium apparatus of claim 1 wherein betta fish are contained in each of the first and second aquarium chambers.

4. The multi-chamber selective-exposure aquarium apparatus of claim 3 wherein both the betta fish are male.

* * * * *